United States Patent [19]

Marsh et al.

[11] Patent Number: 4,646,831

[45] Date of Patent: Mar. 3, 1987

[54] PRECISION CONNECTOR FOR WELL INSTRUMENTATION

[75] Inventors: John L. Marsh; Edward C. Fraser, both of Cupertino; Louis H. Rorden, Los Altos; William H. Bauer, Moraga, all of Calif.

[73] Assignee: Develco, Incorporated, Sunnyvale, Calif.

[21] Appl. No.: 650,665

[22] Filed: Sep. 14, 1984

[51] Int. Cl.[4] .................. E21B 17/14; E21B 49/00; F16D 1/00

[52] U.S. Cl. .................. 166/242; 73/152; 175/45; 403/339; 403/340; 403/368

[58] Field of Search .............. 33/312, 313; 166/242, 166/113; 175/45, 320; 403/297, 358, 374, 368, 314, 339, 340; 73/152

[56] References Cited

U.S. PATENT DOCUMENTS

| | | | |
|---|---|---|---|
| 3,428,343 | 2/1969 | Downie | 403/358 |
| 3,791,043 | 2/1974 | Russell | 33/312 |
| 3,935,642 | 2/1976 | Russell | 33/302 |
| 4,171,924 | 10/1979 | Schuermann et al. | 403/340 X |

Primary Examiner—Stuart S. Levy
Assistant Examiner—David Werner
Attorney, Agent, or Firm—Cushman, Darby & Cushman

[57] ABSTRACT

For the directional drilling of boreholes, the orientation of accelerometer modules, magnetometer modules and gyroscopes or other directional sensing devices must be accurately known and maintained with respect to each other and to external mounting devices. This is accomplished by a self-aligning segmented cylindrical connection which accurately maintains modules in rotational alignment with each other for all three directions of rotation, even if the mating surfaces of the connection experience wear due to rough use in the drilling application or repeated calibration in a calibration fixture. Wedged surfaces on each of the male and female portions of the connection constitute the mating surfaces, and are the only surfaces at which the male and female portions contact one another. A depression between the mating surfaces defined by the female portion permits reproducible angular displacement of one portion with respect to the other even if one or both portions are worn. The connection has great ability to resist relative rotation of the two segments being connected under the application of a bending force because the connection, by its unique design, translates bending load into tensile load with respect to the screws which fasten the connection together.

11 Claims, 12 Drawing Figures

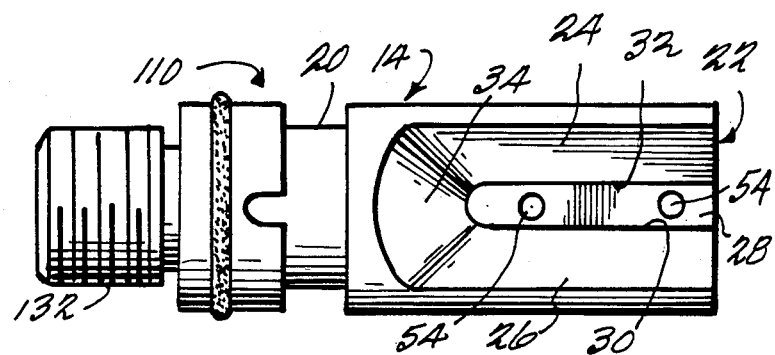
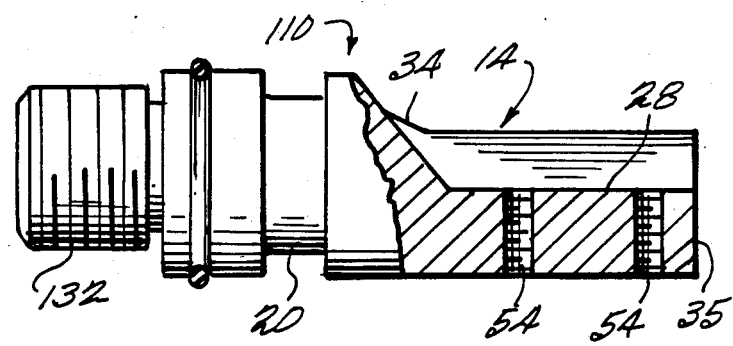
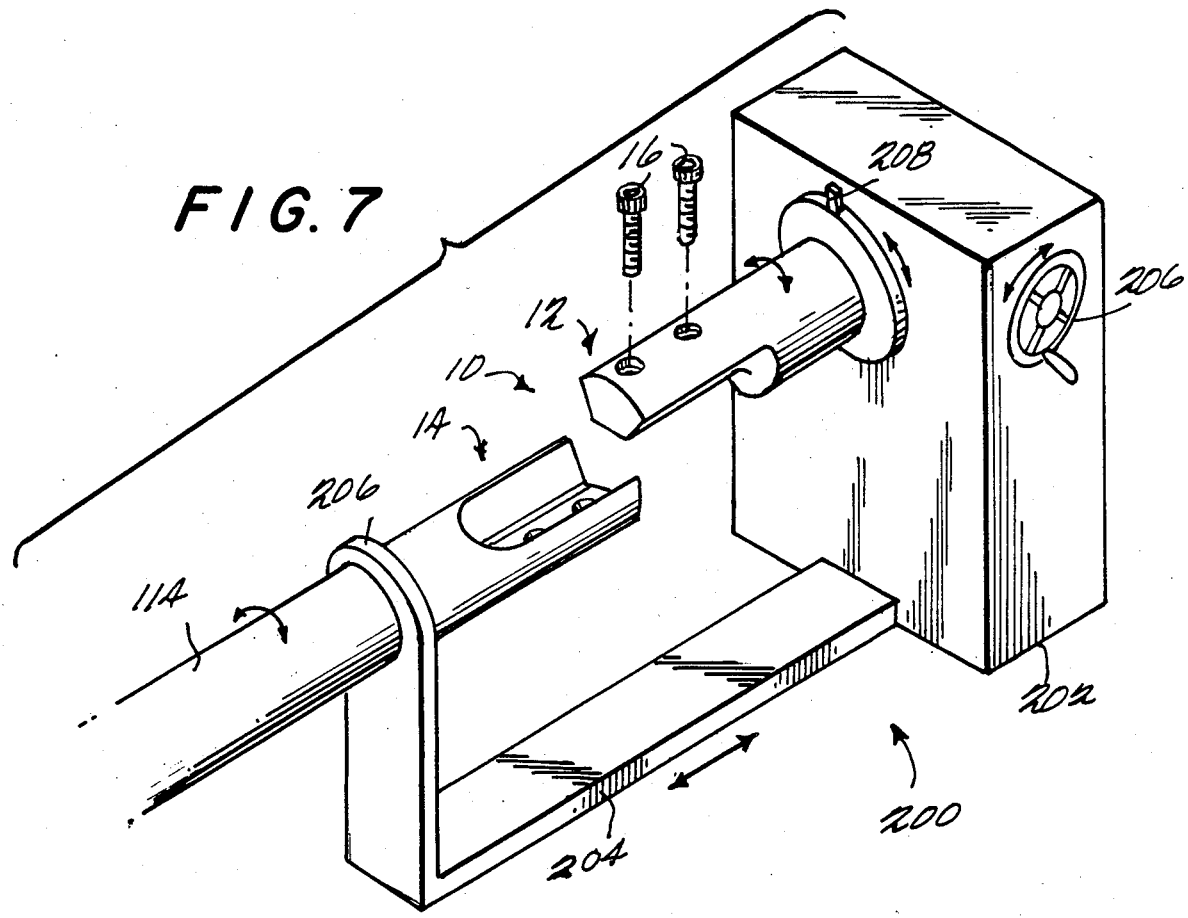

PRECISION CONNECTOR FOR WELL INSTRUMENTATION

FIELD OF THE INVENTION

The present invention is related to the field of directional borehole drilling, and more specifically to oil, gas and mineral drilling. More particularly, the present invention is related to an arrangement for assuming that different segments of an assembly of downhole instrumentation devices are held together such that a predetermined, reproducible angular relationship is maintained between the segments.

BACKGROUND OF THE INVENTION

Downhole well instrumentation is often used to monitor the direction in which a well is being drilled. Typically, instruments such as magnetometers and inclinometers are lowered down into a borehole being drilled. The instruments monitor the orientation of the assembly lowered downhole with respect to the directions of the magnetic and gravitational forces of the earth, thereby providing useful information as to the direction in which the borehole is being drilled. To interpret the information produced by the downhole instrumentation, however, it is necessary that the orientation of the instrumentation with respect to the borehole be known.

One way of establishing a fixed positional relationship between the instrumentation and the borehole is to align the instrumentation with the casing of the borehole using, for example, a mule shoe. As is well known, a mule shoe is a structure, terminating the instrumentation assembly, which includes inclined guide surfaces and an alignment slot. The mule shoe is fixed in angular position with respect to the instrumentation assembly. A projection (such as a pin or the like) is disposed on the inner surface of the borehole casing. When the instrumentation assembly is lowered into the borehole, the projecting pin engages the guide surfaces of the mule shoe, causing the entire instrumentation assembly to rotate to a position wherein the projecting pin engages the alignment slot of the mule shoe. The instrumentation assembly is thereby aligned to a predetermined known angular orientation with respect to the borehole.

Instrumentation assemblies typically by necessity comprise a plurality of respective segments or units. For instance, it is usually desirable to encase part of the instrumentation assembly in a pressure-proof "barrel" (e.g. cylinder) to protect it from the great pressures which are often encountered downhole, while maintaining other parts (such as the mule shoe) in direct contact with the borehole casing. The instrumentation cannot usually be manufactured as an integral unit since repair and replacement of the instrumentation would thereby become exceedingly difficult. Connections or other mechanical coupling means are therefore required to mechanically couple the instrumentation assembly to the mule shoe and to the pressure barrel.

Any means used to couple the instrumentation assembly to the mule shoe (or other borehole alignment means) may not introduce an unknown angular displacement into the angular relationship between the assembly and the mule shoe. If such an angular displacement is introduced, the assembly will no longer be precisely aligned with the projection for the borehole casing, and error in the interpretation of the sensed orientation of the borehole with respect to the earth's fields will result. Likewise, means used to connect any section of the instrumentation assembly to another may not introduce unknown angular displacements into the relative orientation between the connected segments.

Although it is typically not possible to achieve zero angular displacement between two connected sections, it is only necessary for accurate measurement that the angular displacement between the sections be known. The angular displacement between the sections can be accurately measured on the surface, and the measurements performed by the downhole instrumentation can be adjusted to compensate for the angular displacement to yield accurate results. However, it has been found that due to the wear caused by simply mating and unmating conventional connections used to connect segments together, the angular displacement which they introduce may change appreciably over time. The rate of wear of a connection is increased drastically if the connection is not mated securely (thereby permitting one part of the connection to vibrate with respect to the other part as the instrumentation assembly is lowered downhole). Wear of connection mating surfaces on the order of less than one thousandth of an inch is enough to appreciably change the angular displacement which the connection introduces into the instrumentation assembly, thereby introducing substantial inaccuracy into the orientation measurement performed by the assembly.

It is typically difficult or impossible for measurement of the angular displacement introduced by the connection to be performed in the field to the accuracy required. Hence, the practice in the industry is to periodically send instrumentation assemblies, including connections, to a test lab where accurate calibration can be performed. In order to reduce equipment down time, maintenance costs, etc., it is desirable that recalibration need not be required often. Therefore, an arrangement for connecting two sections of a downhole apparatus which introduces an angular displacement which does not change appreciably with wear would highly be desirable.

SUMMARY OF THE INVENTION

The arrangement in accordance with the present invention provides a highly reliable and strong mechanical connection between two sections of a borehole instrumentation assembly such that any angular displacement introduced between the two connected sections does not change appreciably with connection wear and is highly reproducible upon successive demating and mating of the sections. In accordance with the present invention, a male connection portion is fixed to one of the segments to be connected. The male portion includes first and second surfaces inclined with respect to one another at a predetermined angle. A female connection portion is fixed to the other of segments to be connected. A cavity adapted to receive at least part of the male portion is defined in the female portion. Third and fourth substantially planar surfaces are disposed in the cavity corresponding in shape respectively to the first and second surfaces and inclined relative to one another at the predetermined angle so as to mate with the first and second surfaces of the male portion when the cavity receives the male portion. The cavity has a bottom surface and the male portion has a fifth surface which is spaced from the bottom of the cavity when the first and second surfaces are mated respectively with the third and fourth surfaces so that interference between the fifth surface and the cavity bottom does not prevent such mating if there is a change in the depth within the cavity that the male portion must achieve to provide such mating. Fasteners fasten the male and female portions together.

The first and second surfaces of the male portion are preferably substantially identical in size and shape and are displaced from one another by a predetermined angle. This predetermined angle is preferably 90°. The third and fourth surfaces of the female portion are likewise preferably substantially identical in size and shape and have substantially the same size and shape as the first and second surfaces of the male portion. The third and fourth surfaces are preferably displaced from one another by the predetermined angle. One of the segments connected together may be a mule shoe.

BRIEF DESCRIPTION OF THE DRAWINGS

These and other features of the present invention can be better appreciated and by reading the following detailed description taken in conjunction with the accompanying drawings, of which:

FIG. 5(A) is a top view in plan of a pressure barrel end cap utilizing the female portion of the connection shown in FIG. 2;

FIG. 5(B) is a side view in partial cross-section of the end cap shown in FIG. 5(A);

FIG. 7 is a side view in perspective of a calibration fixture used in accordance with the present invention to determine the angular displacement introduced by the connection shown in FIG. 2.

DETAILED DESCRIPTION OF THE PREFERRED EMBODIMENT

Figure 1:
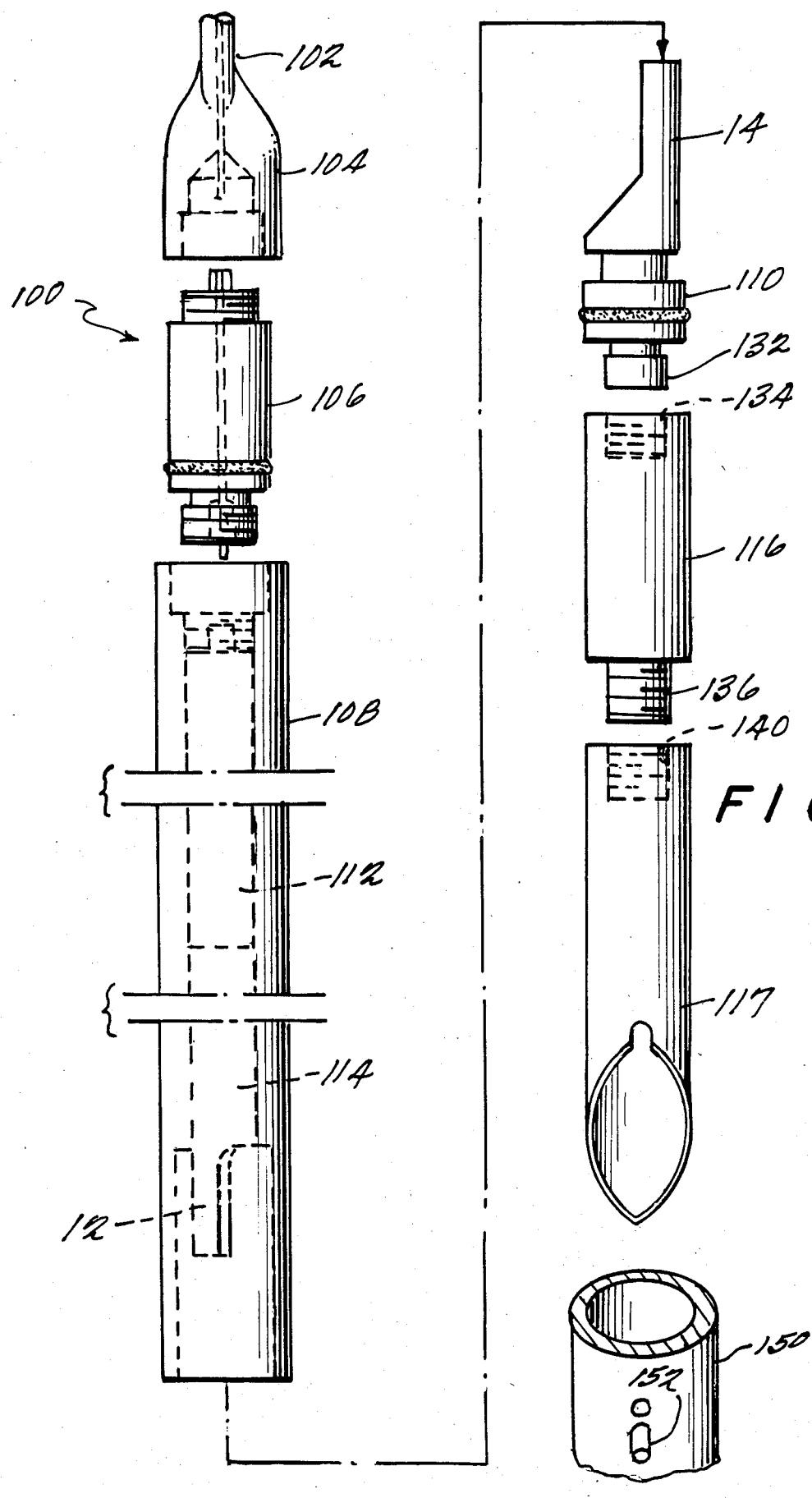
FIG. 1 is a diagrammatical depiction of an instrumentation assembly in accordance with the present invention.

FIG. 1 is a diagrammatical depiction of a instrumentation assembly 100 in accordance with the present invention. Instrumentation assembly 100 is adapted to be lowered into a borehole 150 and comprises a cable 102, a cable head 104, an upper pressure barrel plug 106, a pressure barrel 108, a lower pressure barrel plug 110, a telemetry module 112, a borehole instrumentation cluster 114, one or more spacer bars 116 and a mule shoe 117. Telemetry module 112 and instrumentation cluster 114 are disposed within pressure barrel 108. Pressure barrel 108, which is sealed at one end by upper pressure plug 106 and at the other end by lower pressure plug 110, protects telemetry module 112 and instrumentation cluster 114 from the high pressures encountered downhole. Spacer bars 116 connect lower pressure barrel plug 110 to mule shoe 117. Mule shoe 117 aligns instrumentation assembly 100 with respect to the borehole in a conventional manner. Cable head 104 connects cable 102 to upper pressure barrel plug 106, thereby supporting assembly 100 on the cable. Instrumentation cluster 114 and lower plug 110 are connected together by a dematable connection (comprising a male portion 14 and a female portion 12) to prevent the cluster and the plug from rotating with respect to one another about a direction axial to cable 102 (and borehole 150).

Figure 2:
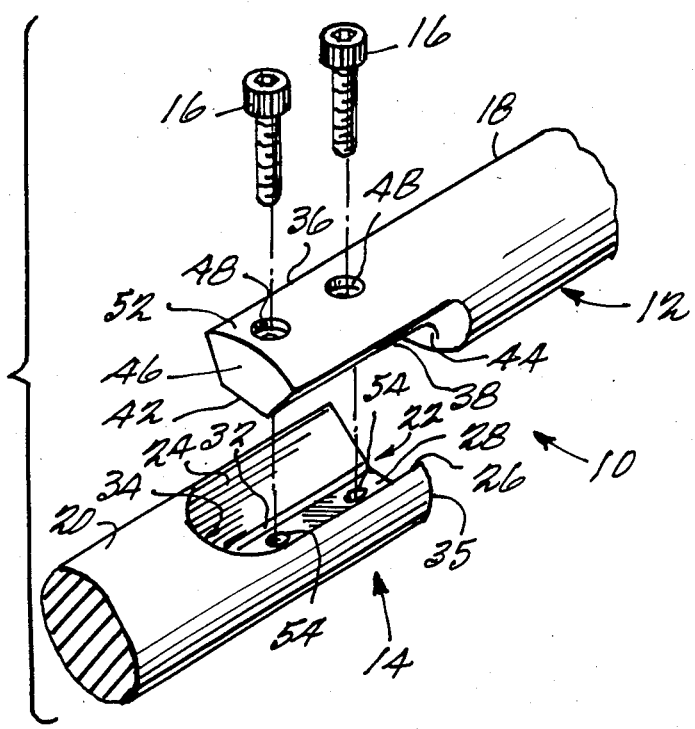
FIG. 2 is an exploded side elevated view in perspective of a preferred embodiment of a connection in accordance with the present invention.

FIG. 2 shows an exploded side view in perspective of a preferred embodiment of a connection 10 used to connect one or more segments of assembly 100 together (instrumentation cluster 114 and lower plug 110 in the preferred embodiment) in accordance with the present invention. Connection 10 comprises a male portion 12, a female portion 14, and means for fastening the male and female portions together. The means for fastening preferably comprises two threaded hex socket capscrews 16 (8–32 threads by ¾ inches long in the preferred embodiment). Male portion 12 and female portion 14 are each generally cylindrical in shape and may each be fabricated by properly machining a cylindrical metal shaft (as will become apparent shortly). The cylindrical shaft 18 for the male portion 12 and the cylindrical shaft 20 for the female portion preferably having a diameter of 1.000 inches. While shafts 18 and 20 in the preferred embodiment preferably comprise aluminum or titanium, any material having suitable strength (and non-magnetic properties if the connections are to be placed in proximity with magnetic-sensitive instrumentation) could be used.

Figure 3A:
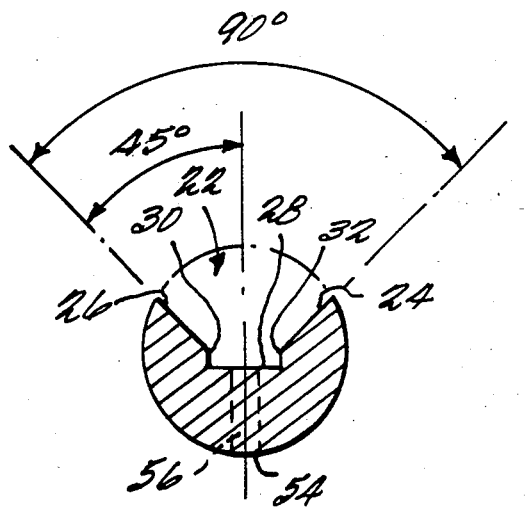
FIG. 3(A) is an end view in cross-section of the female portion of the connection shown in FIG. 2.

A cavity 22 is defined in female portion 14. Referring now more particularly to FIGS. 2 and 3 (A), a substantially planar surface 24 mainly defines one wall of cavity 22, while another substantially planar surface 26 mainly defines the other wall of the cavity. Planar surfaces 24 and 26 are substantially similar in size and shape in the preferred embodiment. An angle of 90° (plus or minus 0.1° in the preferred embodiment) is defined between planar surfaces 24 and 26. A planar surface 28 is defined at the bottom of cavity 22 between planar surfaces 24 and 26. In the preferred embodiment, planar surface 28 is indented slightly (by 0.100 inches) from surfaces 24 and 26. A wall 30 which joins surface 28 with surface 26 makes a right angle with surface 28 in the preferred embodiment, just as a wall 32 joining surfaces 28 and 24 makes a right angle with surface 28. Surfaces 24 and 26 are 1.250 inches long (i.e. in the direction axial to shaft 20) in the preferred embodiment, and meet in a curved surface 34 (which in the preferred embodiment is curved for ease of machining and for strength; other shapes for this joining surface might be suitable depending upon the application). Female portion 14 terminates in a substantially planar end surface 35.

Figure 3B:
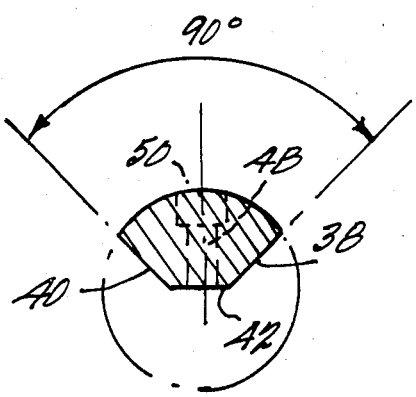
FIG. 3(B) is an end view in cross-section of the male portion of the connection shown in FIG. 2.

Referring now more particularly to FIGS. 2 and 3(B), male portion 12 includes a mating projection 36 which is adapted to be received by cavity 22 of female portion 14. Mating projection 36 defines a substantially planar surface 38 and a substantially planar surface 40. Surfaces 38 and 40 in the preferred embodiment have substantially the same dimensions and size as surfaces 24 and 26, and define between them an angle of 90° (plus 0.1°−0.0°), the same or slightly larger angle as defined between surfaces 24 and 26. Mating projection 36 also defines a substantially planar surface 42 between and separating surfaces 38 and 40. Surfaces 38 and 40 of mating projection 38 come together in a curved surface 44 in the preferred embodiment. Mating projection 36 terminates in a substantially planar end surface 46.

As mentioned previously, cavity 28 of female portion 12 is adapted to receive mating projection 36 of male portion 12. When mating projection 36 is disposed into cavity 22, surfaces 26 and 38 are in registry with and contact one another, while surfaces 24 and 40 are likewise in registry with and contact one another. Surfaces 28 and 42 are in registry with one another, but do not contact one another because surface 28 is indented with respect to surfaces 24 and 26. The length of mating projection 36 is slightly smaller than the length of cavity 22 so that end surface 46 does not contact curved surface 34, and curved surface 44 contacts no part of female portion 14. Hence, while surface 38 of male portion 12 contacts surface 26 of female portion 14, and surface 40 of the male portion contacts surface 24 of the female portion, no other surfaces of the male and female portions contact one another.

Two holes 48 are defined through mating projection 36. Holes 48 extend from a top surface 52 to surface 42. Holes 48 in the preferred embodiment are 3/16 inches in diameter with 5/16 inch diameter 0.188 inch deep bores 50 terminating on the top (curved) surface 52 of mating projection 36. Holes 48 are each adapted to receive one of threaded hex screws 16. Two threaded holes 54 (8–32 threads in the preferred embodiment) are defined through female portion 14 from surface 28 to a bottom (curved) surface 56. It will be noted that in the preferred embodiment each of surfaces 24 and 26 defines an angle of about 45° with respect to a line axial to holes 54, while each of surfaces 38 and 40 define an angle of about 45 degrees with respect to a line axial to holes 48.

Holes 48 and 54 are in registry with one another when mating projection 36 is disposed in cavity 22. In the preferred embodiment, the one of holes 54 nearest end surface 35 of female part 14 is 0.250 inches away from the end surface, and the other one of holes 54 is displaced from the first hole by 1.000 inches.

To mate male portion 12 of connection 10 with female portion 14, mating projection 36 is disposed in cavity 22 so that holes 48 and holes 54 are in registry. Screws 16 are then inserted into holes 48 and rotated to engage with the threads of holes 54. Screws 16 are rotated until there is zero clearance between surfaces 24 and 40 and between surfaces 26 and 38. A torque of a suitable magnitude is then applied to screws 16 to ensure close and full contact between the mating surfaces and to ensure that male portion 12 does not unintentionally become disengaged from female portion 14.

Mating surfaces 24, 26, 38 and 40 comprise mating vee or wedge-type surfaces which permit accurate and self-alignment of male portion 12 with female portion 14. The mating surfaces form a self-aligning set such that when screws 16 are in place, the mating surfaces are fully mated. Male portion 12 and female portion 14 are self-aligning in that when mated, respective shafts 18 and 20 are axial to one another and rotated by a constant angular displacement 8 with respect to one another. While this angular displacement is nominally zero, it will not be exactly zero due to imperfections in machining, tolerances, etc. However, due to the unique configuration of connection 10, this angular displacement is reproducible (i.e. shafts 18 and 20 will be rotated with respect to one another by the exact same angle $\theta$ upon subsequent demating and mating of connection 10).

The connection between shafts 18 and 20 is exceptionally resistant to rotation of one of the shaft with respect to each other. This is because the only shear loading that is applied to screws 16 is derived from forces longitudinal to the shafts. In a borehole instrumentation assembly, the force exerted on shafts 18 and 20 in the longitudinal direction is relatively light (merely the weight of a mule shoe 118 and other assemblies disposed downhole from connection 10, as will be explained). Bending load of connection 10 is translated into a tensile load on screws 16, which is the direction in which the screws are the strongest (i.e. the screws are loaded in tension, which is their strongest direction). Connection 10 is very strong in bending because mating surfaces 24, 26, 38 and 40 support bending forces in all except the direction of disassembly of the connection. The mating projection 36 is held substantially immobile in cavity 22, such that the relative angular positions of shaft 18 and 20 cannot change unless screws 16 are stretched, and surfaces 24 and 40 and surfaces 26 and 38 may not move relative to one another unless the screws stretch. Hence, connection 10 transfers shear load into tensile load (at least partially). The force required to change the angular postion of shaft 18 with respect to shaft 20 when connection 10 is mated is very great, far beyond any forces to which the connection is exposed in this direction when downhole.

Because of the aspect of connection 10 that surfaces 28 and 42 do not contact one another, mating surfaces 24, 26, 38 and 40 may wear without affecting the rotational alignment of female portion 14 with male portion 12. Thus, connection 10 permits accurate alignment for all three angles of rotation of shaft 12 with respect to shaft 20 even when the mating surfaces have been subjected to symmetric wear. Wearing of surfaces 24, 26, 38 and 40 will be symmetrical under normal conditions, since wear principally occurs due to vibration or other displacement of the mating surfaces with respect to one another. Minimal wear of the mating surfaces 24, 26, 38 and 40 will occur since little or no relative motion between the mating surfaces may exist. Any wear which does occur (due to, for example, mating and demating of connection 10, vibration due to insufficient tightening of screws 16, or repeated mating with a calibration fixture) will, in general, be symmetrical.

As explained above, wearing of surfaces 24 and 26 is symmetrical with respect to these two surfaces and wearing of surfaces 38 and 40 is symmetrical with respect to these two surfaces. Hence, it does not matter whether one of male portion 12 and female portion 14 is more worn than the other. The angular displacement of female portion 20 with respect to any particular, symmetrically-worn male portion 12 will be reproducible, and likewise, the relative angular displacement between male portion 12 and any symmetrically-worn male portion 14 will also be reproducible.

Figure 4A:
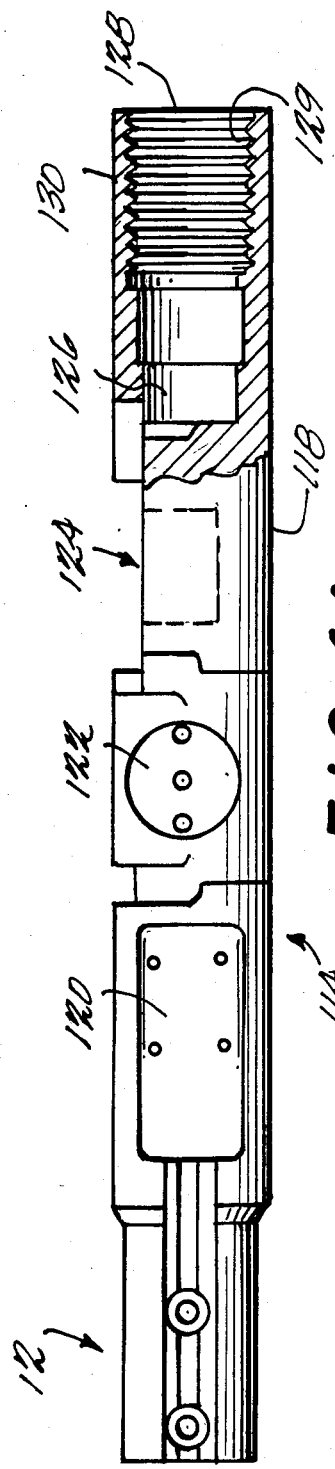
FIG. 4(A) is a top view in plan of an instrumentation cluster utilizing the male portion of the connection shown in FIG. 2.
Figure 4B:
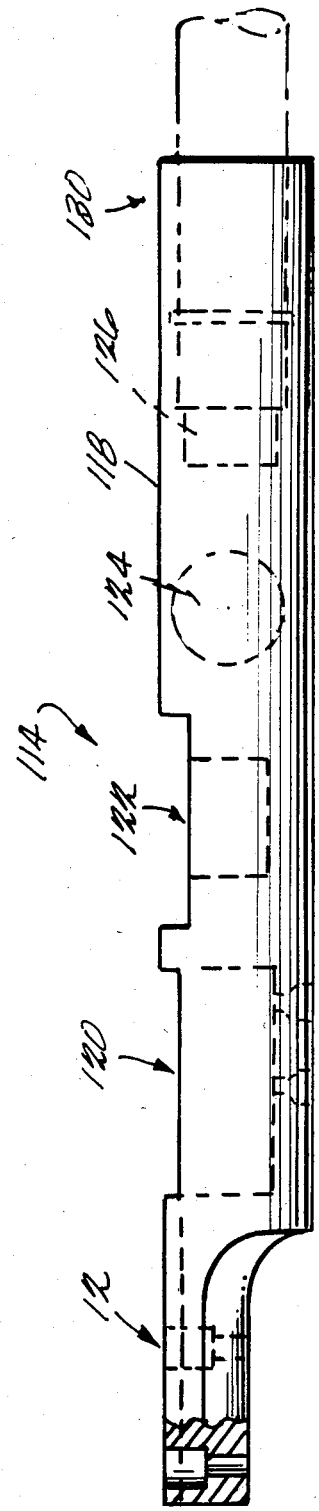
FIG. 4(B) is a side view in partial cross-section of the cluster shown in FIG. 4(A)

FIGS. 4(A) and 4(B) are detailed views of instrumentation cluster 114. Instrumentation cluster 114 in the preferred embodiment comprises a shaft 118 terminating at one end in male portion 12 of connection 10. A number of cavities are also defined in shaft 118. For instance, a cavity 120 defined in shaft 118 is adapted to received a conventional three-axis magnetometer, while cavities 122, 124 and 126 defined in the shaft are adapted to each receive a conventional inclinometer (each one of cavities 122, 124 and 126 receives an inclinometer sensitive to a different orthogonal direction). A cylindrical aperture 128 is defined in an axial direction at an end 130 of shaft 118 opposite to the end at which male portion 12 is located. Aperture 130 is used to connect instrumentation cluster 114 to telemetry module 112 (such as by threads 129 engaging with a threaded solid rod retained by a dowel pin, not shown). Electrical connections from the various sensors disposed in instrumentation cluster 114 to telemetry module 112 may also be established via conductors disposed in aperture 128 if desired. Telemetry module 112 processes the information produced by the instrumentation cluster 114 and transmits it to the surface via cable 102.

The orientation of the magnetometer and inclinometers contained within instrumentation cluster 114 is established relative to the casing of the borehole by mule shoe 117, via spacing bars 116 and lower plug 110. FIGS. 5(A) and 5(B) show lower plug 110 in greater detail. Plug 110 has a female portion 14 of connection 10 disposed at one end, and a threaded shaft 132 at the other. The female portion 14 of lower plug 110 mates with the male portion 12 of instrumentation cluster 114 in a manner previously described in connection with FIG. 3. Threaded shaft 132 engages with a threaded aperture 134 of spacer bar 116 in a conventional fashion. Likewise, a threaded shaft 136 at the end of spacer bar 116 opposite to that defining aperture 134 engages with a threaded aperture 140 defined in mule shoe 118 in a conventional fashion. Mule shoe 117, spacer bar 116, and lower plug 110 may be regarded as a single unit, each of the individual parts of which may not rotate with respect to the other (for instance, dowel pins threaded through the threaded shafts and the aperture which they engage may be used to prevent rotation of any of the mule shoe, spacer bar and lower plug with respect to its neighbor).

When mule shoe engages with a projecting pin 152 projecting from the inner surface of the casing 150 of a borehole (shown in FIG. 3), the mule shoe rotates and aligns itself in accordance with the position of the pin. Spacer bar 116 and lower plug 110 rotate together with the mule shoe. Lower plug 10 is coupled to instrumentation cluster 114 via connection 10, such that the angular position of the instrumentation cluster exactly corresponds to that of mule shoe 117. Due to the unique configuration of connection 10, there is substantially no rotational slop or play between instrumentation cluster 114 and lower plug 110 about the axis defined by the longitudinal direction of the cluster. The magnetometer and inclinometers contained with in instrumentation cluster 114 are correctly aligned with mule shoe 117, thereby producing information which can be analyzed at the surface to indicate borehole direction.

Figure 6A:
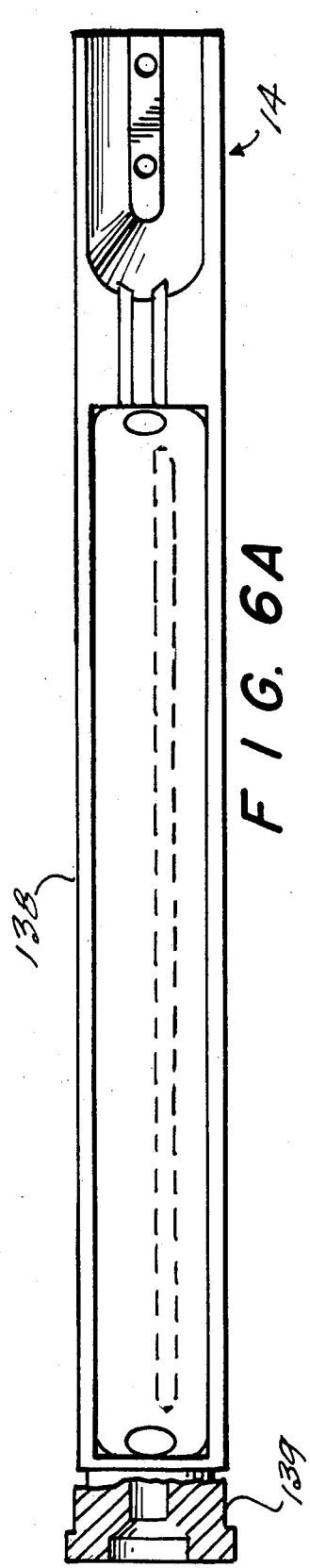
FIG. 6(A) is a top view in plan and partial cross-section of a magnetometer housing utilizing the female portion of the connection shown in FIG. 2.
Figure 6B:
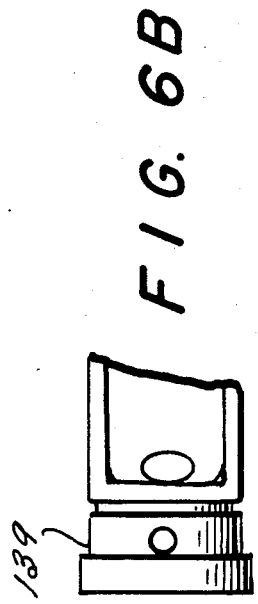
FIG. 6(B) is a detailed top view in plan of an end of the magnetometer housing shown in FIG. 6(A)
Figure 6C:
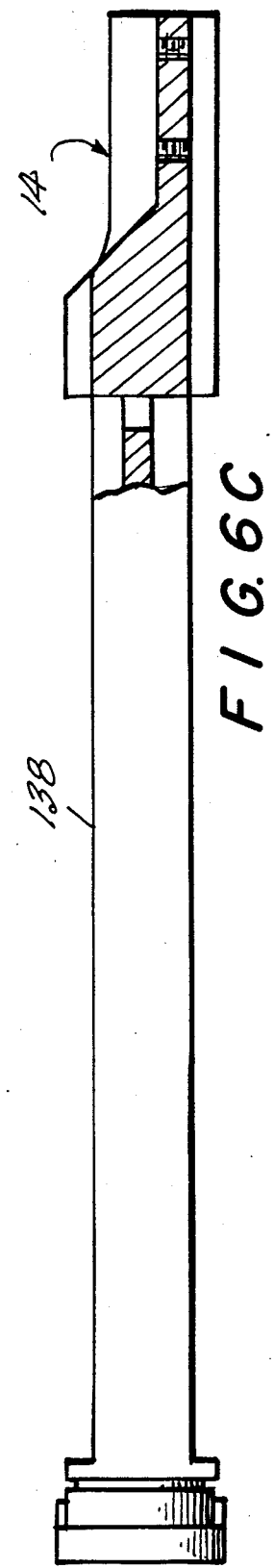
FIG. 6(C) is a side view in partial cross-section of the magnetometer housing shown in FIG. 6(A)

FIGS. 6(A)-6(C) show a magnetometer housing 138 one end of which utilizes a female portion 14 of connection 10. Magnetometer housing 138 may house a magnetometer instrument to be used, in addition to, or instead of, instrumentation cluster 114. Connection 10 may be utilized anywhere in assembly 100 where it is desirable to have a disengageable connection between two components but where no slop in the angular displacement of one connected components with respect to another may be tolerated.

FIG. 7 illustrates a calibration fixture 200 for measuring the angular displacement introduced by connection 10 into the orientation of the instrumentation cluster 114. Calibration fixture 200 mainly comprises a male portion 12 of connection 10, a rotational offset gauge 202, a slidable support bracket 204 and a sliding collar 206. Male portion 12 is substantially unworn, and is rotationally coupled to rotational offset gauge 202. By rotating a rotary handle 206 on gauge 202, the angular position of male portion 12 can be accurately set and measured with respect to a calibration mark 208. To calibrate instrumentation cluster 114 using calibration fixture 200, the instrumentation cluster is slid through sliding collar 206, and female portion 14 of connection 10 (which terminates the instrumentation cluster) is engaged with male portion 12 (rotatably connected to gauge 202). Bracket 204 is positioned so that sliding collar 206 is near the end of instrumentation cluster 114 opposite female portion 14 (in order to restrict the movement of the instrumentation cluster to only rotation about its axial direction). The outputs of the magnetometer and inclinometers of instrumentation cluster 114 are monitored and measurements are made for different attitudes of the instrumentation cluster. Rotary crank 206 is rotated to calibrate the measurements according to a standard indicative of the actual directions of the earth's magnetic and gravitational forces. When the measurements derived from instrumentation cluster 144 correspond to the standard for a given angular position of gauge 202, the angular position of the gauge is noted and recorded (to be later used in correlating measurements downhole). In this way, instrumentation cluster 114 (including the female portion 14 of connection 10) is calibrated, the calibration taking into account the effects of any wear of the female portion. After calibration, accurate measurements using instrumentation cluster 114 may be made utilizing the calibration information. Thus, even if instrumentation cluster 114 has a worn female portion 14 of connection 10, the errors resulting from the worn female portion can be used with the correction data produced by the calibration procedure because the errors due to the worn mating surfaces are fixed, correctable and reproducible.

Although exemplary embodiments have described in detail above, those skilled in the art will appreciate that many variations and modifications can be made without departing from the novel and advantageous features of the inventions. Moreover, the present invention is by no means limited to the particular components described above, but rather could be implemented in a variety of different ways. For instance, although an angle of 90 degrees is defined between the mating surfaces on each of the male and female portions, any suitable angle could be used instead. While the mating surfaces of each of the male and female portions are joined in a curved surface, a surface of any desired shape could be substituted therefore. Likewise, it is not necessary that the walls 30 and 32 make a right angle with surface 28 of female portion 14, although this is the preferable configuration. Although dimensions for the preferred embodiment have been given, any suitable dimensions could be used for the connection. Downhole instrumentation has been isolated as an application for which the present invention is particularly useful, but other downhole applications may also benefit from the present invention. Accordingly, all such variations and modifications are intended to be included within the scope of the claims.

What is claimed is:

1. A borehole instrumentation assembly comprising
a plurality of segments adapted to travel through a borehole together;

a male portion fixed to one of said segments having first and second surfaces inclined with respect to one another at a predetermined angle;

a female portion fixed to the other of said segments defining a cavity adapted to receive at least part of said male portion and having third and fourth surfaces disposed in said cavity corresponding in shape respectively to said first and second surfaces and inclined relative to one another at said predetermined angle so as to mate with said first and second surfaces of said male portion when said cavity receives said male portion, said cavity having a bottom surface and said male portion having a fifth surface which is spaced from the bottom of said cavity when said first and second surfaces mate respectively with said third and fourth surfaces so that interference between said fifth surface and said cavity bottom does not prevent said first and second surfaces of said male portion from mating with said third and fourth surfaces of said female portion if there is a change in the depth within said cavity that said male portion must achieve to provide said mating; and means for fastening said male and female portions together while said first and second surfaces are mated with said third and fourth surfaces.

2. An assembly as in claim 1 wherein:

said first and second surfaces are substantially identical in size and shape and are displaced from one another by said predetermined angle; and said third and fourth surfaces are substantially identical and size and shape and have substantially the same size and shape as the first and second surfaces, said third and fourth surfaces being displaced from one another by said predetermined angle.

3. An assembly as in claim 2 wherein said predetermined angle is 90 degrees.

4. An assembly as in claim 1 wherein at least one of said segments comprises a mule shoe.

5. A connection for connecting two segments of a borehole instrumentation assembly comprising:

a male portion fixable to one of said segments having first and second surfaces inclined with respect to one another at a predetermined angle;

a female portion fixable to the other of said segments defining a cavity adapted to receive at least part of said male portion and having third and fourth surfaces disposed in said cavity corresponding in shape respectively to said first and second surfaces and inclined relative to one another at said predetermined angle so as to mate with said first and second surfaces of said male portion when said cavity receives said male portion, said cavity having a bottom surface and said male portion having a fifth surface which is spaced from the bottom of said cavity when said first and second surfaces thereof are mated with said third and fourth surfaces so that interference between said fifth surface and said cavity bottom does not prevent said first and second surfaces of said male portion from mating with said third and fourth surfaces of said female portion if there is a change in the depth within said cavity that said male portion must achieve to provide said mating; and means for fastening said male and female portions together while said first and second surfaces are mated with said third and fourth surfaces.

6. A connection as in claim 5 wherein:

said first and second surfaces are substantially identical in size and shape and are displaced from one another by said predetermined angle; and said third and fourth surfaces are substantially identical and size and shape and have substantially the same size and shape as the first and second surfaces, said third and fourth surfaces being displaced from one another by said predetermined angle.

7. A connection as in claim 6 wherein said predetermined angle is 90 degrees.

8. An assembly as in claim 1 wherein said fastening means includes at least one threaded connector which is threadly received within holes respectively in said male and female portions which register with one another when said first and second surfaces are mated with said third and fourth surfaces.

9. An assembly as in claim 2 wherein each of said first through fourth surfaces is substantially planar.

10. A connection as in claim 5 wherein said means for fastening said male and female portions together includes at least one threaded connector which is threadably received within holes respectively in said male and female portions which register with one another when said first and second surfaces are mated with said third and fourth surfaces.

11. A connection as in claim 6 wherein each of said first through fourth surfaces is substantially planar.

* * * * *